UNITED STATES PATENT OFFICE 2,671,752

CYCLOPENTANOPERHYDROPHENAN-THRENE COMPOUNDS AND PROCESS

Alejandro Zaffaroni, Rochester, N. Y., assignor to Syntex S. A., Mexico City, Mexico, a corporation of Mexico No Drawing. Application July 6, 1951,
Serial No. 235,558

6 Claims. (Cl. 195—51)

The present invention relates to a novel process for the production of cyclopentanoperhydrophenanthrene compound.

More particularly the present invention relates to a novel process for the preparation of the adrenal hormones corticosterone and 17α-hydroxycorticosterone from the corresponding 11-desoxycorticosterone compounds. Although it has previously been suggested that the adrenal gland under appropriate conditions is able to achieve the introduction of an oxygen-containing substituent in ring C of the cyclopentanoperhydrophenanthrene nucleus, the procedures involved, such as perfusion of the whole gland, etc., have been difficult to perform and the yields of the desired compounds have been rather low.

In accordance with the present invention the surprising discovery has been made, however, that corticosterone may be prepared from 11-desoxycorticosterone, and 17α-hydroxycorticosterone may be prepared from 17-hydroxy-11-desoxycorticosterone by in vitro incubations of the starting compounds with animal adrenal gland material, such as beef or hog adrenals. Preferably the adrenal gland material is in finely divided form, as for example in the form of homogenates, breis or slices and the reaction, i. e. incubation, takes place under certain specific conditions as hereinafter set forth. The reaction according to the present invention is indicated by the following equation:

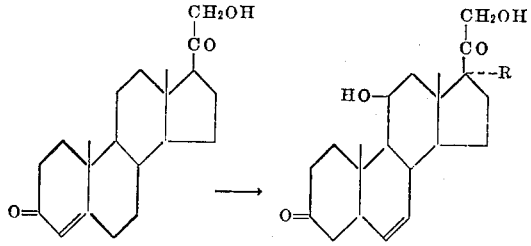

In the above equation R is hydrogen or an α-hydroxy group.

In carrying out the process of the present invention fresh animal adrenal glands, which may be used immediately after slaughtering or kept in a container surrounded by ice-salt mixture for periods not longer than twelve hours, may be ground in a meat grinder or suspended in a buffer solution to be hereinafter described in detail and homogenized as with a Waring Blender. The finely divided adrenal gland tissue is mixed with a buffer solution which is capable of maintaining a pH of from 6.8 to 7.8, these buffer solutions being of a well-known type, such as phosphate, carbonate, veronal or borate buffers. The buffer solution utilized is made up by adding sufficient buffer salt solution to a physiological saline solution which may also contain, in addition to the sodium chloride of the saline solution, small amounts of potassium and magnesium ions. Further, the buffer solution should also contain as a reaction promoting agent an alkali metal salt of fumaric or citric acid, as for example potassium or sodium fumarate or citrate. The fumarate or citrate salt is preferably present in the buffer solution in an amount equivalent to at least two and one-half mols of the salt to two hundred parts by weight or grams of the buffer solution, although larger amounts may be utilized. The homogeneous mixture, either by stirring or homogenizing of the finely divided adrenal gland material, should preferably contain one part of tissue to three parts of solution; although it is within the scope of the present invention to utilize from one part of solution to five parts of solution to each part of tissue. The aqueous solution is preferably at a temperature of 37° C. when the mixture with the adrenal tissue is made. This temperature is also preferably maintained during the subsequent incubation which is carried for a period of the order of two hours. Longer periods may also be utilized and the reaction appears to be substantially complete at the end of one hour and at least partially complete at the end of shorter periods, as for example one-half hour. The starting compounds 11-desoxycorticosterone or 17-hydroxy-11-desoxycorticosterone are added to the aqueous mixture in solution in a suitable solvent, preferably propylene glycol, this solution being also maintained at the same temperature as the incubation medium, i. e. preferably 37° C. The hormone is in relatively dilute solution in the propylene glycol, as for example one part of the hormone to thirty parts of propylene glycol, although larger or smaller amounts may be used. Preferably, an amount of incubation medium is utilized so that for each part of the hormone there is a large amount of tissue, as for example one part of steroid to a thousand parts of tissue. During the entire period of incubation the mixture hereinbefore set forth is subjected to agitation.

Although the preferable temperature for incubation, as previously indicated, is 37° C. the incubation takes place quite readily at temperatures just above room temperature, as for example 25° C. and in general temperatures between 5 and 45° C. may be utilized. When the reaction is complete, the reaction mixture may then be extracted with a suitable organic solvent, such as chloroform and chromatographic separation is then preferably utilized for the separation of the corticosterone or 17-hydroxycorticosterone. In the alternative, other methods of separation, such as dialysis, may be utilized.

The following specific example serves to illustrate but is not intended to limit the present invention:

*Example*

Fresh hog or beef adrenal glands are first passed through a meat grinder. 250 parts by weight of the ground adrenals were then stirred with 750 parts of the solution prepared by mixing together 40 parts of a 4.5% solution of sodium chloride plus 1.6 parts of a 5.75% solution of potassium chloride plus 0.4 part of a 19.1% solution of magnesium sulphate, plus 20 parts of an 0.1 molar phosphate buffer of pH 7.4 plus 30 parts of an 0.15 molar solution of sodium fumarate or sodium citrate and 110 parts of water. This solution had a pH of around 7.4 and was at a temperature of 37° C. when added to the adrenal tissue. Thereafter one part of desoxycorticosterone dissolved in 30 parts of propylene glycol at 37° C. was added with stirring to the adrenal aqueous solution mixture. The final mixture was then incubated at 37° C. for two hours with vigorous stirring. The incubation mixture, after two hours, was extracted with a suitable organic solvent, such as chloroform, and subjected to chromatographic separation. Corticosterone was obtained in a yield of more than 60%. The same identical procedure utilizing 17-hydroxy-11-desoxycorticosterone resulted in a better than 60% yield of 17-hydroxycorticosterone.

I claim:

1. A process for the production of a compound selected from the class consisting of corticosterone and 17α-hydroxycorticosterone comprising dissolving the corresponding 11-desoxy compound in propylene glycol, adding the solution of 11-desoxy compound to an incubation mixture of fresh, finely divided animal adrenal tissue in a physiological saline solution containing potassium and magnesium ions and a buffer capable of maintaining a pH of from 6.8 to 7.8 and a salt selected from the class consisting of alkali metal fumarates and citrates, and incubating under agitation at a temperature of between 5 and 45° C. for at least one-half hour, the adrenal tissue being present in an amount equal to from one part of tissue to 1 to 5 parts by volume of buffer solution, the starting compound being present in an amount approximately equal to one part of compound to 1000 parts of tissue, and the alkali metal salt being present in an amount equal to at least 2½ mols to each 200 parts by weight of the buffer solution.

2. A process for the production of corticosterone comprising dissolving the corresponding 11-desoxycorticosterone in propylene glycol, adding the solution of 11-desoxycorticosterone to an incubation mixture of fresh, finely divided animal adrenal tissue in a physiological saline solution containing potassium and magnesium ions and a buffer capable of maintaining a pH of from 6.8 to 7.8 and a salt selected from the class consisting of alkali metal fumarates and citrates, and incubating under agitation at a temperature of between 5 and 45° C. for at least one-half hour, the adrenal tissue being present in an amount equal to from one part of tissue to 1 to 5 parts by volume of buffer solution, 11-desoxycorticosterone being present in an amount approximately equal to one part of compound to 100 parts of tissue, and the alkali metal salt being present in an amount equal to at least 2½ mols to each 200 parts by weight of the buffer solution.

3. A process for the production of 17α-hydroxycorticosterone comprising dissolving the corresponding 17-hydroxy-11-desoxycorticosterone in propylene glycol, adding the solution of 17-hydroxy-11-desoxycorticosterone to an incubation mixture of fresh, finely divided animal adrenal tissue in a physiological saline solution containing potassium and magnesium ions and a buffer capable of maintaining a pH of from 6.8 to 7.8 and a salt selected from the class consisting of alkali metal fumarates and citrates, and incubating under agitation at a temperature of between 5 and 45° C. for at least one-half hour, the adrenal tissue being present in an amount equal to from one part of tissue to 1 to 5 parts by volume of buffer solution, 17-hydroxy-11-desoxycorticosterone being present in an amount approximately equal to one part of compound to 1000 parts of tissue, and the alkali metal salt being present in an amount equal to at least 2½ mols to each 200 parts by weight of the buffer solution.

4. A process for the production of a compound selected from the class consisting of corticosterone and 17α-hydroxycorticosterone comprising dissolving the corresponding 11-desoxy compound in propylene glycol, adding the solution of 11-desoxy compound to an incubation mixture of fresh, finely divided animal adrenal tissue in a physiological saline solution containing potassium and magnesium ions and a buffer capable of maintaining a pH of from 6.8 to 7.8 and a salt selected from the class consisting of alkali metal fumarates and citrates, and incubating under agitation at a temperature of approximately 37° C. for at least one-half hour, the adrenal tissue being present in an amount equal to from one part of tissue to 1 to 5 parts by volume of buffer solution, the starting compound being present in an amount approximately equal to one part of compound to 1000 parts of tissue, and the alkali metal salt being present in an amount equal to at least 2½ mols to each 200 parts by weight of the buffer solution.

5. A process for the production of a compound selected from the class consisting of corticosterone and 17α-hydroxycorticosterone comprising dissolving the corresponding 11-desoxy compound in propylene glycol, adding the solution of 11-desoxy compound to an incubation mixture of fresh, finely divided animal adrenal tissue in a physiological saline solution containing potassium and magnesium ions and a buffer capable of maintaining a pH of from 6.8 to 7.8 and sodium fumarate, and incubating under agitation at a temperature of between 4 and 45° C. for at least one-half hour, the adrenal tissue being present in an amount equal to from one part of tissue to 1 to 5 parts by volume of buffer solution, 11-desoxycorticosterone being present in an amount approximately equal to one part of compound to 1000 parts of tissue, and the sodium fumarate being present in an amount equal to at least 2½ mols to each 200 parts by weight of the buffer solution.

6. A process for the production of a compound selected from the class consisting of corticosterone and 17α-hydroxycorticosterone comprising dissolving the corresponding 11-desoxy compound in propylene glycol, adding the solution of 11-desoxy compound to an incubation mixture of fresh, finely divided animal adrenal tissue in a physiological saline solution containing potassium and magnesium ions and a buffer capable of maintaining a pH of from 6.8 to 7.8 and sodium citrate, and incubating under agitation at a temperature of between 5 and 45° C. for at least one-half hour, the adrenal tissue being present in an amount equal to from one part of tissue to one to 5 parts by volume of buffer solution, 11-desoxycorticosterone being present in an amount approximately equal to one part of compound to 1000 parts of tissue, and the sodium citrate being present in an amount equal to at least 2½ mols to each 200 parts by weight of the buffer solution.

ALEJANDRO ZAFFARONI.

References Cited in the file of this patent

UNITED STATES PATENTS

| Number | Name | Date |
|---|---|---|
| 1,515,976 | Stern | Nov. 18, 1924 |

OTHER REFERENCES

Hechter et al.: J. A. C. S., September 1949, pages 3261–3262.

Hayano et al.: Proc. Soc. Exptl. Biol. and Med. December 1949, pages 700–701.

Hechter et al.: Arch. Bioch., vol. 25, No. 2, pages 457–560, February 1950.

McGinty et al.: Science, October 27, 1950, vol. 112, No. 2913, page 506.

Savard et al.: Endocrinology, December 1950, vol. 47, No. 6, pages 418–28.